(12) United States Patent
Uchida et al.

(10) Patent No.: US 11,081,279 B2
(45) Date of Patent: Aug. 3, 2021

(54) MULTILAYER CERAMIC CAPACITOR

(71) Applicant: Murata Manufacturing Co., Ltd., Nagaokakyo (JP)

(72) Inventors: Kazuhisa Uchida, Nagaokakyo (JP); Naoto Muranishi, Nagaokakyo (JP)

(73) Assignee: MURATA MANUFACTURING CO., LTD.

( * ) Notice: Subject to any disclaimer, the term of this patent is extended or adjusted under 35 U.S.C. 154(b) by 77 days.

(21) Appl. No.: 16/693,678

(22) Filed: Nov. 25, 2019

(65) Prior Publication Data

US 2020/0185152 A1 Jun. 11, 2020

(30) Foreign Application Priority Data

Dec. 7, 2018 (JP) .............................. JP2018-229818

(51) Int. Cl.
| | |
|---|---|
| *H01G 4/12* | (2006.01) |
| *H01G 4/232* | (2006.01) |
| *H01G 4/248* | (2006.01) |
| *C04B 35/468* | (2006.01) |
| *H01G 4/30* | (2006.01) |
| *H01G 4/012* | (2006.01) |

(52) U.S. Cl.
CPC ....... *H01G 4/1227* (2013.01); *C04B 35/4682* (2013.01); *H01G 4/012* (2013.01); *H01G 4/232* (2013.01); *H01G 4/248* (2013.01); *H01G 4/30* (2013.01)

(58) Field of Classification Search
CPC .......................... C04B 35/4682; H01G 4/1227
See application file for complete search history.

(56) References Cited

U.S. PATENT DOCUMENTS

| | | | | |
|---|---|---|---|---|
| 9,666,370 | B2 * | 5/2017 | Wada | ................ C04B 35/62685 |
| 9,786,435 | B2 * | 10/2017 | Oguni | ...................... H01G 4/30 |
| 2016/0118188 | A1 * | 4/2016 | Wada | ....................... H01G 4/30 |
| | | | | 361/301.4 |
| 2016/0358711 | A1 * | 12/2016 | Oguni | ............... C04B 35/62685 |

FOREIGN PATENT DOCUMENTS

JP       2014210685 A    11/2014

* cited by examiner

*Primary Examiner* — Karl E Group
(74) *Attorney, Agent, or Firm* — Arent Fox LLP

(57) ABSTRACT

A multilayer ceramic capacitor that includes outer electrodes and a multilayer body having stacked inner electrode layers and dielectric layers. The dielectric layers in an effective section contain, relative to 100 parts by mole of Ti, 0.7 to 1.2 parts by mole of Si, 0.9 to 1.1 parts by mole of Dy, 0.24 to 0.34 parts by mole of Mg, 0.17 to 0.23 parts by mole of Al, 0.09 to 0.11 parts by mole of Mn, and 0.04 to 0.06 parts by mole of V. The dielectric layers have a Ba/Ti molar ratio of 1.0073 to 1.0083.

12 Claims, 5 Drawing Sheets

MULTILAYER CERAMIC CAPACITOR

CROSS REFERENCE TO RELATED APPLICATIONS

The present application claims priority to Japanese Patent Application No. 2018-229818, filed Dec. 7, 2018, the entire contents of which is incorporated herein by reference.

BACKGROUND OF THE INVENTION

1. Field of the Invention

The present invention relates to a multilayer ceramic capacitor.

2. Description of the Related Art

In recent years, there has been a demand for compact multilayer ceramic capacitors having large electrostatic capacity. The requirements for multilayer ceramic capacitors are increasing year by year.

One of methods for forming dielectric layers with high permittivity in a multilayer ceramic capacitor is a method for growing ceramic grains (crystal grains) (Japanese Unexamined Patent Application Publication No. 2014-210685).

SUMMARY OF THE INVENTION

Although there is a demand for compact multilayer ceramic capacitors, a multilayer ceramic capacitor including thin dielectric layers and thin inner electrode layers has an issue where formation of partially thin dielectric layers during grain growth causes short circuits and low insulation and degrades reliability.

Accordingly, it is a main object of the present invention to provide a multilayer ceramic capacitor that has reduced short-circuit rate, large electrostatic capacity, and improved mean time to failure (MTTF) while including thin dielectric layers.

According to preferred embodiments of the present invention, a multilayer ceramic capacitor includes a multilayer body having stacked inner electrode layers and dielectric layers; and a pair of outer electrodes on surfaces of the multilayer body and electrically connected to the inner electrode layers. The multilayer body has an effective section where the inner electrode layers face each other with the dielectric layers interposed therebetween in a stacking direction thereof. The dielectric layers in the effective section contain crystal grains having a perovskite compound containing Ba and Ti; and, relative to 100 parts by mole of Ti, 0.7 to 1.2 parts by mole of Si, 0.9 to 1.1 parts by mole of Dy, 0.24 to 0.34 parts by mole of Mg, 0.17 to 0.23 parts by mole of Al, 0.09 to 0.11 parts by mole of Mn, and 0.04 to 0.06 parts by mole of V. The dielectric layers in the effective section have a Ba/Ti molar ratio of 1.0073 to 1.0083. The number of the crystal grains in the dielectric layers in the effective section is 1.9 or less per dielectric layer as viewed in the stacking direction. The dielectric layers in the effective section have a thickness variation (CV) of 14.0% or less.

The ceramic crystal grains have Si, which has fluidity, on the surfaces thereof. External pressure application causes crystal grains to slide on the surfaces of crystal grains. In addition, the metal (e.g., Ni) in the inner electrode layers tends to form balls upon heat application. The heat application to the multilayer body causes the metal contained in the inner electrode layers to form balls and push away surrounding crystal grains in the dielectric layers. As a result, the dielectric layers each have a thin portion and a thick portion. The grain growth starting temperature can be lowered by reducing the Mg content of the dielectric layers of the multilayer ceramic capacitor according to the present invention. The formation of balls from the metal contained in the inner electrode layers can be suppressed by lowering the grain growth starting temperature. Because of a low Si content of the dielectric layers, the crystal grains are unlikely to slide on crystal grain surfaces even upon external pressure application. Plastic deformation can be inhibited accordingly. Moreover, even if the metal contained in the inner electrode layers forms balls and tries to push away surrounding crystal grains, the crystal grains are unlikely to move, and the dielectric layers have a small thickness variation, which can suppress a deterioration in smoothness of the dielectric layers. Therefore, a multilayer ceramic capacitor that has reduced short-circuit rate, large electrostatic capacity, and improved mean time to failure (MTTF) while including thin dielectric layers can be provided.

According to the present invention, there is provided a multilayer ceramic capacitor that has reduced short-circuit rate, large electrostatic capacity, and improved mean time to failure (MTTF) while including thin dielectric layers can be provided.

Other features, elements, characteristics and advantages of the present invention will become more apparent from the following detailed description of preferred embodiments of the present invention with reference to the attached drawings.

DESCRIPTION OF THE PREFERRED EMBODIMENTS

1. Multilayer Ceramic Capacitor

Figure 1:
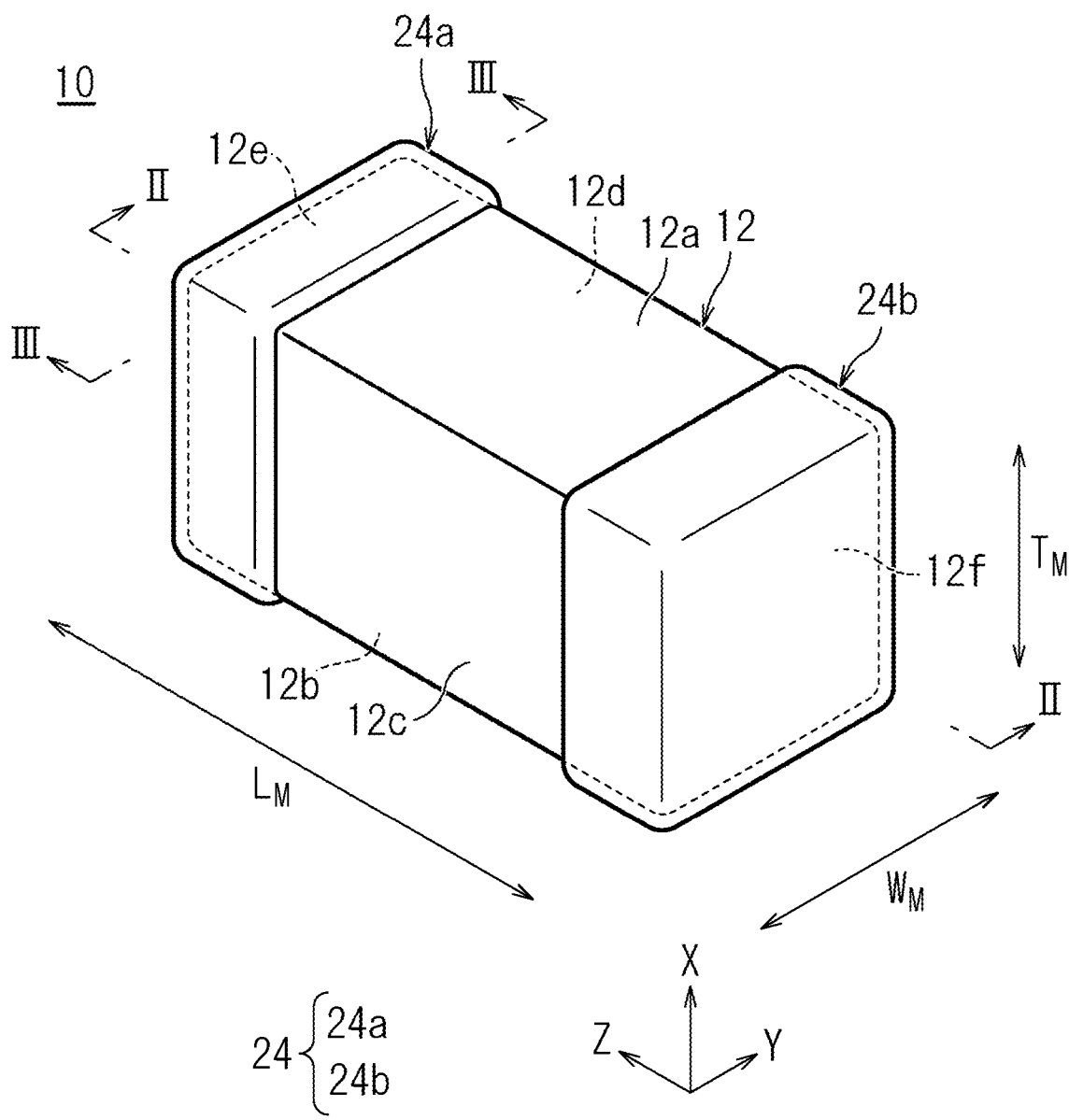
FIG. 1 is an appearance perspective view of an example of a multilayer ceramic capacitor according to the present invention.
Figure 2:
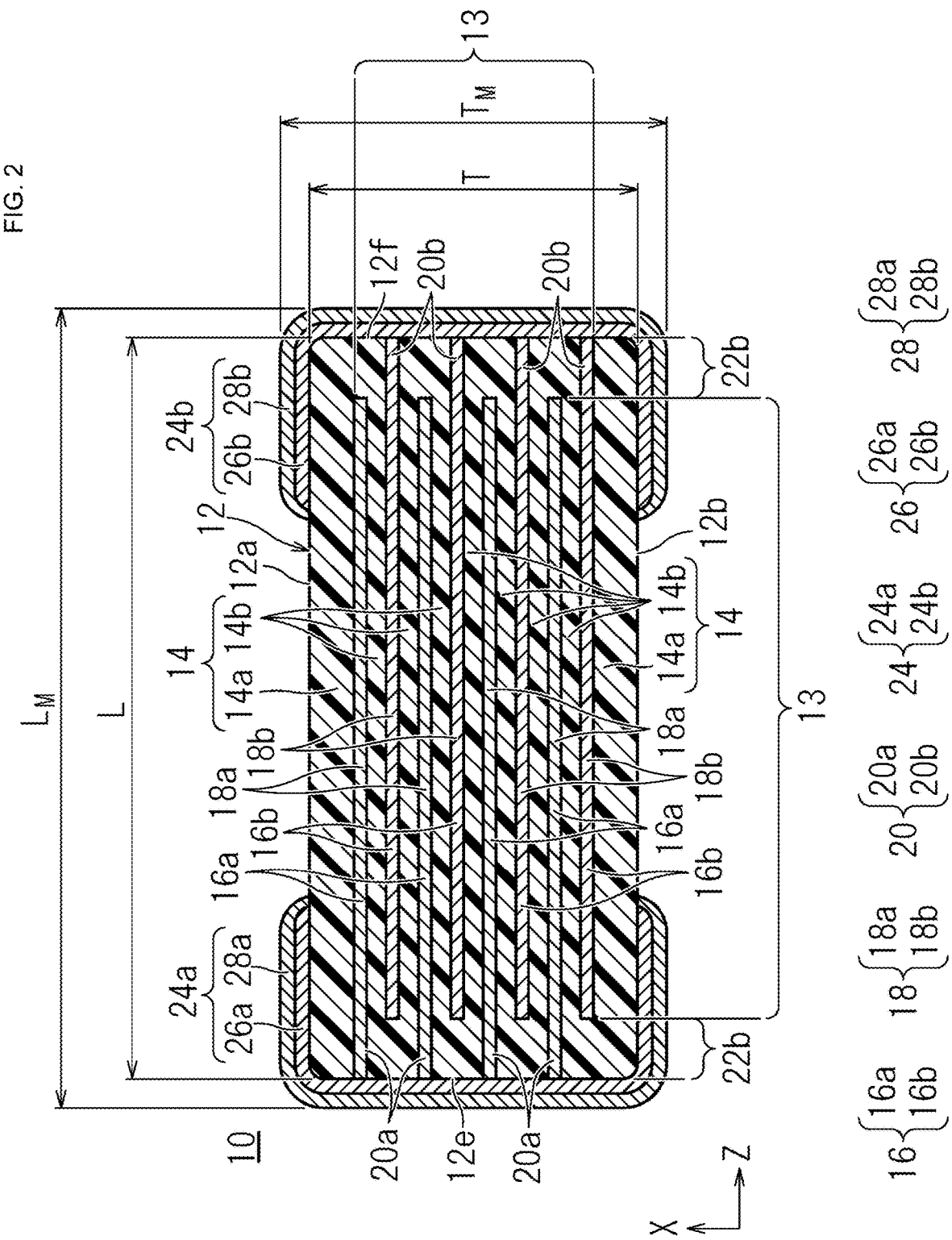
FIG. 2 is an appearance perspective view of the multilayer ceramic capacitor according to the present invention taken along line II-II in FIG. 1.
Figure 3:
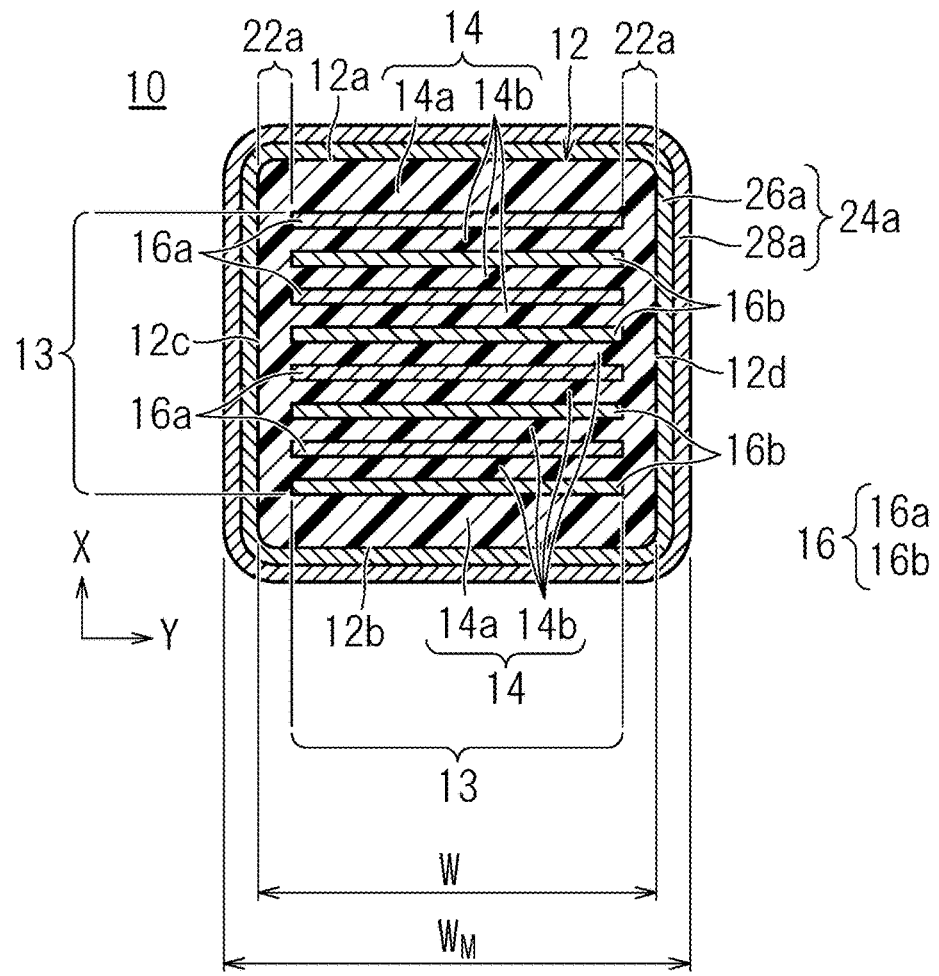
FIG. 3 is an appearance perspective view of the multilayer ceramic capacitor according to the present invention taken along line III-III in FIG. 1.

A multilayer ceramic capacitor according to an embodiment of the present invention will be described below with reference to the drawings. FIG. 1 is an appearance perspective view of an example of a multilayer ceramic capacitor according to the present invention. FIG. 2 is a cross-sectional view of the multilayer ceramic capacitor according to the present invention taken along line II-II in FIG. 1. FIG. 3 is a cross-sectional view of the multilayer ceramic capacitor according to the present invention taken along line III-III in FIG. 1.

As illustrated in FIG. 1 to FIG. 3, a multilayer ceramic capacitor 10 according to this embodiment includes a multilayer body 12 and a first outer electrode 24a and a second outer electrode 24b (a pair of outer electrodes) on surfaces of the multilayer body 12.

Multilayer Body 12

The multilayer body 12 includes plural dielectric layers 14 and plural inner electrode layers 16, which are stacked on top of one another. The multilayer body 12 includes a first main surface 12a and a second main surface 12b, which are opposed to each other in a stacking direction x; a first side surface 12c and a second side surface 12d, which are opposed to each other in a width direction y perpendicular to the stacking direction x; and a first end surface 12e and a second end surface 12f, which are opposed to each other in a longitudinal direction z perpendicular to the stacking direction x and the width direction y. The multilayer body 12 preferably has rounded corners and rounded edges. A corner refers to a place where three adjacent faces of the multilayer body 12 meet, and an edge refers to a place where two adjacent faces of the multilayer body 12 meet. Moreover, the first main surface 12a and the second main surface 12b, the first side surface 12c and the second side surface 12d, and the first end surface 12e and the second end surface 12f may partially or entirely have unevenness or the like.

The multilayer body 12 has an effective section 13 where the inner electrode layers 16 face each other with the dielectric layers 14 interposed therebetween in the stacking direction.

With regard to the dimensions of the multilayer body 12, the dimension L in the longitudinal direction z from the first end surface 12e to the second end surface 12f is preferably 0.6 mm or more and 3.2 mm or less. The dimension W in the width direction y from the first side surface 12c to the second side surface 12d is preferably 0.3 mm or more and 2.5 mm or less. The dimension T in the stacking direction x from the first main surface 12a to the second main surface 12b is preferably 0.5 mm or more and 2.5 mm or less.

Dielectric Layer 14

The dielectric layers 14 include an outer layer part 14a including plural dielectric layers 14, and an inner layer part 14b including plural dielectric layers 14 between plural inner electrode layers 16. The outer layer part 14a includes dielectric layers positioned adjacent to the first main surface 12a and the second main surface 12b of the multilayer body 12, specifically, positioned between the first main surface 12a and the inner electrode layer 16 nearest to the first main surface 12a, and between the second main surface 12b and the inner electrode layer 16 nearest to the second main surface 12b. A region defined by the outer layer parts 14a is the inner layer part 14b. The inner layer part 14b includes an effective section 13, W gap sections 22a described below, and L gap sections 22b described below.

The dielectric layers 14 contain crystal grains 50 having a perovskite structure. The perovskite structure in the effective section 13 is a perovskite compound containing Ba and Ti; and Si, Dy, Mg, Al, Mn, and V. The amounts of these elements in the perovskite compound in the effective section 13 (or in the multilayer body 12) are as described below.

The amounts of the above elements relative to 100 parts by mole of Ti are as described below. The Si content is 0.7 to 1.2 parts by mole. The Dy content is 0.9 to 1.1 parts by mole. The Mg content is 0.24 to 0.34 parts by mole. The Al content is 0.17 to 0.23 parts by mole. The Mn content is 0.09 to 0.11 parts by mole. The V content is 0.04 to 0.06 parts by mole.

The composition of the dielectric layers 14 in the effective section 13 can be determined by dissolving the dielectric layers 14 in an acid and performing ICP emission spectrometry.

The dielectric layers 14 in the effective section 13 have a Ba/Ti molar ratio of 1.0073 to 1.0083.

The number of the crystal grains 50 in the dielectric layers 14 in the effective section 13 is 1.9 or less per dielectric layer as viewed in the stacking direction.

The thickness variation (CV) of the dielectric layers 14 in the effective section 13 is 14.0% or less. The thickness variation (CV) of the dielectric layers 14 in the effective section 13 is more preferably 11.0% or less. This is because a CV of 11.0% or less provides high reliability (high temperature loading test) and reduces short-circuit rate.

The mean thickness of the dielectric layers 14 in the effective section 13 is preferably 0.65 µm or less. The mean thickness of the dielectric layers 14 in the effective section 13 is more preferably 0.52 µm to 0.65 µm. When the mean thickness of the dielectric layers 14 in the effective section 13 is 0.52 µm to 0.65 µm, the short-circuit rate can be reduced and the mean time to failure (MTTF) can be improved while the thickness of the dielectric layers is reduced. The number of the dielectric layers including the dielectric layers of the outer layer part 14a is preferably 300 to 1200. The thickness of the outer layer part 14a is preferably 50 µm to 200 µm.

The ratio of the grain size of the dielectric layers 14 in the effective section 13 in a central part to the grain size of the dielectric layers 14 in the effective section 13 in a region of the side surface-side end parts of the inner electrode layers 16 is preferably 0.35 to 0.50. With this grain size ratio, the short-circuit rate can be reduced, and the electrostatic capacity and the mean time to failure (MTTF) can be improved.

Inner Electrode Layer 16

The inner electrode layers 16 include plural first inner electrode layers 16a and plural second inner electrode layers 16b. The first inner electrode layers 16a are stacked so as to alternate with the plural dielectric layers 14 and are exposed on the first end surface 12e. The second inner electrode layers 16b are stacked so as to alternate with the plural dielectric layers 14 and are exposed on the second end surface 12f.

The first inner electrode layers 16a each include a first counter electrode portion 18a and a first extended electrode portion 20a. The first counter electrode portion 18a is opposite to the second inner electrode layer 16b. The first extended electrode portion 20a extends from the first counter electrode portion 18a to the first end surface 12e of the multilayer body 12. An end part of the first extended electrode portion 20a of the first inner electrode layer 16a extends to the surface of the first end surface 12e of the multilayer body 12 to form an exposed part.

The second inner electrode layers 16b each include a second counter electrode portion 18b and a second extended electrode portion 20b. The second counter electrode portion 18b is opposite to the first inner electrode layer 16a. The second extended electrode portion 20b extends from the second counter electrode portion 18b to the second end surface 12f of the multilayer body 12. An end part of the second extended electrode portion 20b of the second inner electrode layer 16b extends to the surface of the second end surface 12f of the multilayer body 12 to form an exposed part.

Counter electrode portions 18 include the first counter electrode portions 18a of the first inner electrode layers 16a, and second counter electrode portions 18b of the second inner electrode layers 16b. The shape of the first counter electrode portions 18a and the second counter electrode portions 18b is preferably, but not necessarily, rectangular. The corners of the first counter electrode portions 18a and the second counter electrode portions 18b may be rounded or may be obliquely formed, for example, in a tapered shape.

The extended electrode portions 20 include the first extended electrode portions 20a of the first inner electrode layers 16a, and the second extended electrode portions 20b of the second inner electrode layers 16b. The shape of the first extended electrode portions 20a and the second extended electrode portions 20b is preferably, but not necessarily, rectangular. The corners of the first extended electrode portions 20a and the second extended electrode portions 20b may be rounded or may be obliquely formed, for example, in a tapered shape.

The width of the first counter electrode portions 18a of the first inner electrode layers 16a and the second counter electrode portions 18b of the second inner electrode layers 16b may be the same as the width of the first extended electrode portions 20a of the first inner electrode layers 16a and the second extended electrode portions 20b of the second inner electrode layers 16b, or one of these widths may be smaller than the other.

The multilayer body 12 includes the first inner electrode layers 16a and the second inner electrode layers 16b; the first counter electrode portions 18a and the second counter electrode portions 18b, which are opposite to the first inner electrode layers 16a and the second inner electrode layers 16b; and side parts 22a (W gap sections) of the multilayer body 12 positioned between the first side surface 12c and a group of the first counter electrode portions 18a and the second counter electrode portions 18b and between the second side surface 12d and a group of the first counter electrode portions 18a and the second counter electrode portions 18b; and end parts 22b (L gap sections) of the multilayer body 12 positioned between the first end surface 12e and a group of the first counter electrode portions 18a and the second counter electrode portions 18b and between the second end surface 12f and a group of the first counter electrode portions 18a and the second counter electrode portions 18b and including the first extended electrode portions 20a of the first inner electrode layers 16a and the second extended electrode portions 20b of the second inner electrode layers 16b.

The W gap sections 22a may be formed by applying a ceramic paste containing crystal grains to the side surfaces. When the W gap sections 22a are formed by applying a ceramic paste containing crystal grains to the side surfaces, the W gap sections 22a preferably contain a perovskite compound containing Ba and Ti; and Dy, Mg, Mn, Si, Al, and V. The amounts of these elements in the W gap sections 22a are as described below.

The amounts of the above elements in the W gap sections 22a relative to 100 parts by mole of Ti are as described below. The Si content is 1.8 to 2.5 parts by mole. The Mg content is 2.00 to 3.50 parts by mole. The Dy content is 0.9 to 1.1 parts by mole. The Al content is 0.17 to 0.23 parts by mole. The Mn content is 0.09 to 0.11 parts by mole. The V content is preferably 0.04 to 0.06 parts by mole.

The dielectric layers in the W gap sections 22a preferably have a Ba/Ti molar ratio of 1.0073 to 1.0083.

The composition of the dielectric layers in the W gap sections 22a can be determined by dissolving the W gap sections 22a in an acid and performing ICP emission spectrometry.

The first inner electrode layers 16a and the second inner electrode layers 16b may be formed of, for example, a suitable electrical conducting material, for example, a metal such as Ni, Cu, Ag, Pd, or Au; or an alloy containing at least one of these metals, such as an Ag—Pd alloy.

In this embodiment, the first counter electrode portion 18a faces the second counter electrode portion 18b with the dielectric layer 14 interposed therebetween to form an electrostatic capacity, exhibiting capacitor characteristics.

The thickness of the first inner electrode layers 16a and the thickness of the second inner electrode layers 16b are preferably, for example, 0.2 μm to 2.0 μm. The mean of the thickness of the first inner electrode layers 16a and the thickness of the second inner electrode layers 16b is preferably 0.45 μm or less. With such thickness, more dielectric layers 14 and more inner electrode layers 16 can be stacked on top of one another even in the same dimension T in the stacking direction x, resulting in a large electrostatic capacity. The number of the inner electrode layers 16 is preferably 15 to 200.

Outer Electrode 24

The outer electrode 24 includes the first outer electrode 24a and the second outer electrode 24b. The first outer electrode 24a is electrically connected to the first inner electrode layers 16a and is disposed on the first end surface 12e. The second outer electrode 24b is electrically connected to the second inner electrode layers 16b and is disposed on the second end surface 12f. The first outer electrode 24a and the second outer electrode 24b are preferably disposed to extend to part of the first main surface 12a, part of the second main surface 12b, part of the first side surface 12c, and part of the second side surface 12d. The first outer electrode 24a and the second outer electrode 24b are preferably formed to extend to at least part of the second main surface 12b positioned on the mounting surface side. The first outer electrode 24a and the second outer electrode 24b each includes a base electrode layer 26 and a plating layer 28.

With regard to the dimensions (including the outer electrodes) of the multilayer ceramic capacitor 10, the dimension $L_M$ in the longitudinal direction z from the first end surface 12e to the second end surface 12f is preferably 1.05 mm to 1.15 mm. The dimension $W_M$ in the width direction y from the first side surface 12c to the second side surface 12d is preferably 0.55 mm to 0.065 mm. The dimension $T_M$ in the stacking direction x from the first main surface 12a to the second main surface 12b is preferably 0.55 mm to 0.065 mm.

2. Method for Manufacturing Multilayer Ceramic Capacitor

Next, a multilayer ceramic capacitor according to the present invention will be described by using the multilayer ceramic capacitor 10 according to this embodiment as an example. The process for preparing a dielectric raw material mixture (dielectric ceramic raw material) will be described first, and the process for producing the multilayer ceramic capacitor 10 will be described next.

Preparation of Dielectric Raw Material Mixture

First, $Ba_mTiO_3$ (m is a Ba/Ti molar ratio) is weighed and disaggregated by wet mixing in a ball mill.

Next, $Dy_2O_3$, $MgCO_3$, $MnCO_3$, $SiO_2$, $Al_2O_3$, and $V_2O_5$ are weighed as additives so as to obtain the molar amounts (the Al-based amount for $Al_2O_3$, the V-based amount for $V_2O_5$) described in Table 1 relative to 100 parts by mol of Ti in the $Ba_mTiO_3$. These additives are added to the $Ba_mTiO_3$ to provide a powder mixture. The powder mixture is wet-mixed in a ball mill to provide a uniform dispersion. The dispersion is dried to provide a dielectric raw material mixture (dielectric ceramic raw material). The preparation composition can be determined by performing ICP emission spectrometry on this raw material.

Production of Multilayer Ceramic Capacitor

A polyvinyl butyral-based binder and ethanol, which is an organic solvent, are added to the dielectric raw material mixture prepared above. The obtained mixture is wet-mixed in a ball mill for a predetermined time to prepare a ceramic slurry. The ceramic slurry is formed into a sheet shape in such a manner that the dielectric element thickness after firing is, for example, 0.52 μm to provide ceramic green sheets.

Next, a conductive paste mainly containing Ni is applied to the ceramic green sheets by screen printing to form a conductive paste layer (inner electrode pattern) for forming an inner electrode layer in such a manner that the electrode thickness after firing is 0.45 μm. The main component of the conductive paste layer (inner electrode pattern) is not limited to Ni and may be, for example, Cu or Pd.

In addition, ceramic green sheets having a conductive paste layer are stacked on top of one another with, interposed therebetween, ceramic green sheets having no conductive paste layer. At this time, the ceramic green sheets having a conductive paste layer are stacked in such a manner that the extending end parts of the conductive paste layers are staggered. A ceramic green sheet having no conductive paste layer is stacked with heat and pressure applied in such a manner that the thickness of the outer layer part 14a on one side after firing is, for example, 25 μm. Ceramic green sheets having a conductive paste layer are formed on the obtained multilayer object in such a manner that the extending end parts of the conductive paste layers are staggered. A ceramic green sheet having no conductive paste layer is stacked in such a manner that the thickness of the outer layer part 14a on one side after firing is, for example, 24 μm to prepare a multilayer chip.

The chip is cut with a dicing saw. At this time, W gap sections 22a may be formed by exposing the conductive paste layers on the side surfaces by means of cutting and attaching the ceramic green sheets to the side surfaces. Alternatively, the W gap sections 22a may be formed by cutting the chip so as not to expose the conductive paste layers on the side surfaces. The mean thickness of the W gap sections 22a after firing is 18 μm. The thickness of the W gap sections 22a after firing is preferably 5 μm to 35 μm, more preferably 10 μm to 30 μm, still more preferably 15 μm to 25 μm, and yet still more preferably 18 μm to 20 μm. When the thickness of the W gap sections 22a after firing is 18 μm to 20 μm, the strength of the dielectric layers 14 can be improved while an internal defect caused by a difference in shrinkage can be suppressed. The composition of the attached ceramic green sheets may be the same as that of the dielectric raw material mixture (dielectric ceramic raw material) described below. When the composition of the attached ceramic green sheets is different from that of the dielectric raw material mixture (dielectric ceramic raw material), the grain growth adjacent to the side surface-side end parts of the inner electrode layers 16 is suppressed by increasing the Mg content, resulting in an increased number of grain boundaries. As a result, the intensity of electric field applied to the crystal grains 50 can be reduced to improve reliability. In addition, the formation of balls from the metal contained in the inner electrode layer 16 in association with grain growth is suppressed to reduce the short-circuit rate.

The obtained multilayer chip is subjected to a heat treatment at a maximum temperature of 270° C. under $N_2$ flow. Subsequently, the multilayer chip is subjected to a heat treatment at a maximum temperature of 800° C. in an atmosphere with an oxygen partial pressure $Log(PO_2)$ of −15.0 MPa under $N_2$—$H_2O$—$H_2$ flow. Next, the multilayer chip is fired at a maximum temperature of 1260° C. at a heating rate of 20° C./sec in an atmosphere with an oxygen partial pressure $Log(PO_2)$ of −8.2 MPa under $N_2$—$H_2O$—$H_2$ flow. The multilayer chip is cooled to near room temperature immediately after a maximum temperature of 1260° C. is reached in firing. Subsequently, the multilayer chip is subjected to a heat treatment at a maximum temperature of 1090° C. for 35 minutes in an atmosphere with an oxygen partial pressure $Log(PO_2)$ of −12.1 MPa under $N_2$—$H_2O$—$H_2$ flow.

Outer electrodes 24 are formed by applying a conductive paste containing copper as a main component to end surfaces 12e and 12f of the fired multilayer chip to which the inner electrode layers 16 are extended and baking the conductive paste at 900° C. In addition, the surface layers of the outer electrodes 24 are subjected to Ni—Sn plating (Sn plating is performed after Ni plating) by means of wet plating. The multilayer ceramic capacitor 10 is manufactured accordingly.

3. Experimental Examples (1) Experimental Example 1

A multilayer ceramic capacitor 10 was produced according to the above method for manufacturing a multilayer ceramic capacitor, and individual multilayer chips during manufacture were checked for their stacked state. In this case, W gap sections 22a were formed by attaching a dielectric having the same composition as the dielectric layers in the effective section 13. For sample number 1-38, a heat treatment was performed at a maximum temperature of 1085° C. for 35 minutes. The obtained dielectric raw material mixture was subjected to ICP emission spectrometry, and it was found that the composition of the dielectric raw material mixture was substantially the same as the preparation composition shown in Table 1.

The specification of the multilayer ceramic capacitor 10 used in Experimental Example 1 was as follows: the dimension L in the longitudinal direction z from the first end surface 12e to the second end surface 12f was 1.05 mm to 1.15 mm; the dimension W in the width direction y from the first side surface 12c to the second side surface 12d was 0.55 mm to 0.065 mm; and the dimension T in the stacking direction x from the first main surface 12a to the second main surface 12b was 0.55 mm to 0.065 mm. The thickness of the dielectric layer in the effective section 13 was 0.52 μm, and the number of layers was 540.

Next, the multilayer ceramic capacitor according to each sample was evaluated in the following manner.

(a) Measurement of Dielectric Layer Grain Size (a-1) Production of Samples for Observation Five samples were fractured so as to expose the W-T cross section at a depth of about ½ in the direction L of the samples. To clearly identify the boundaries (grain boundaries) between grains in the dielectric layer, the above samples were subjected to a heat treatment. The temperature of the heat treatment was a temperature at which grain growth did not occur and the boundaries were clearly identified. In this experimental example, the temperature of the heat treatment was 1000° C.

(a-2) Measurement of Grain Diameter (Grain Size)

Figure 4:
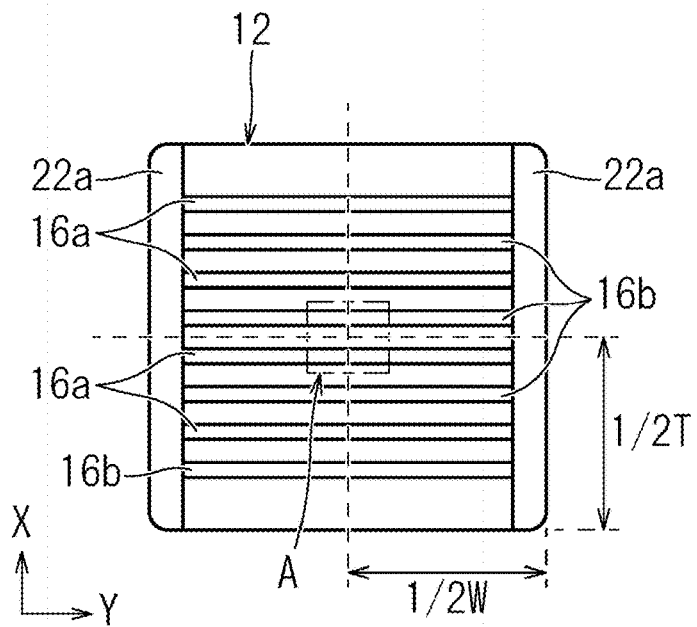
FIG. 4 is a W-T cross-sectional view of the multilayer ceramic capacitor according to the present invention illustrating a measurement region in which the diameter of grains is measured in Experimental Example 1.

As illustrated in FIG. 4, the grains in the dielectric layer were observed at a magnification of 20000 times with a scanning electron microscope (SEM) at a position of about ½ in the directions W and T of the W-T cross section (region A). The size of the field view was a region of 6.3 µm×4.4 µm.

From the obtained SEM image, 300 grains were randomly extracted for each sample. The area inside the boundaries of each grain was determined by image analysis to calculate an equivalent circular diameter as a grain diameter. The representative value of the grain diameter was calculated as a D50 diameter. The results are shown in Table 1.

(b) Thickness of Inner Electrode Layer (b-1) Polishing

The multilayer ceramic capacitor 10 was erected vertically, and each sample was embedded with resin. At this time, the L-T cross section of each sample was exposed. Next, the L-T cross section was polished with a polishing machine. Polishing was ended at a depth of about ½ in the direction W of the sample to expose the L-T cross section. To eliminate inner electrode sag caused by polishing, the polished surface was processed by ion milling after the end of polishing.

(b-2) Measurement of Inner Electrode Layer Thickness (Electrode Thickness)

Figure 5:
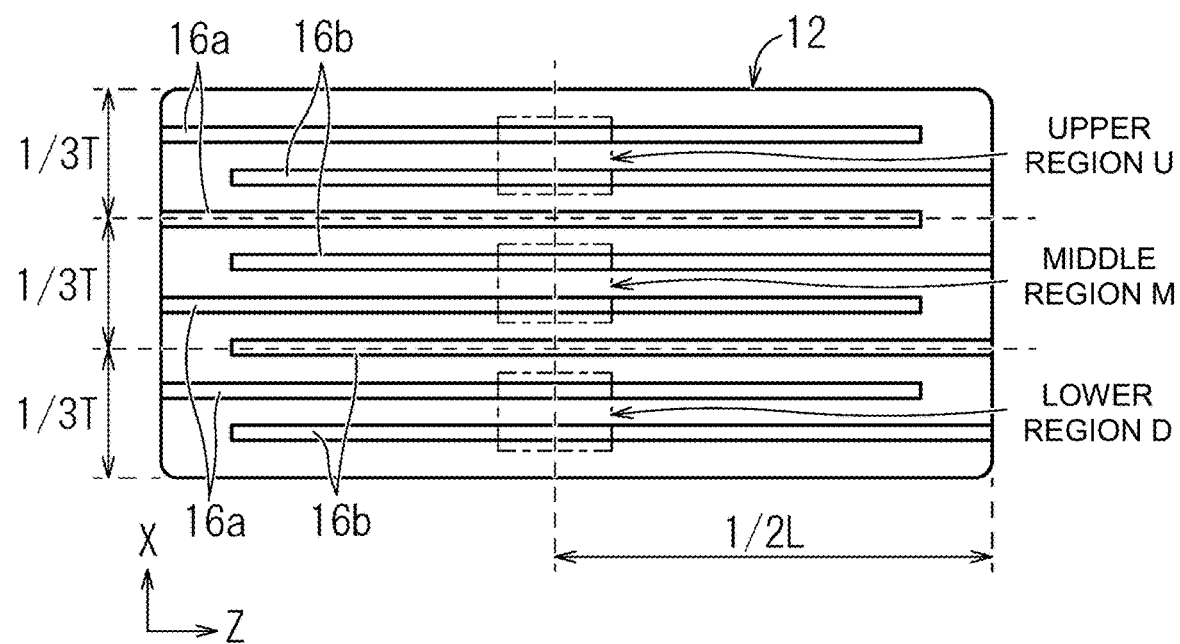
FIG. 5 is a L-T cross-sectional view of the multilayer ceramic capacitor according to the present invention illustrating measurement regions for inner electrode layers and dielectric layers.

In three samples, as illustrated in FIG. 5, a straight line substantially perpendicular to the inner electrode layer direction was set at a distance of about ½ in the direction L of the L-T cross section. Next, a region (effective section 13) of each sample where the inner electrode layers 16 were stacked was divided into three equal regions: an upper region U, a middle region M, and a lower region D. Except for the outermost inner electrode layers 16, the thickness of five inner electrode layers 16 on the perpendicular line was randomly measured near a central part of each region, and the mean was obtained. It is noted that areas where the thickness was not measured because of missing of the internal electrode layer 16 were excluded. The thickness of five layers was measured in each of three regions for each sample (each of three samples), that is, at total 45 points, and the mean was obtained. The thickness of the inner electrode layers 16 was measured by using a scanning electron microscope (SEM). The measurement results are shown in Table 1.

(c) Thickness of Dielectric Layer (c-1) Polishing

The multilayer ceramic capacitor 10 was erected vertically, and each sample was embedded with resin. At this time, the L-T cross section of each sample was exposed. Next, the L-T cross section was polished with a polishing machine. Polishing was ended at a depth of about ½ in the direction W of the sample to expose the L-T cross section. To eliminate inner electrode sag caused by polishing, the polished surface was processed by ion milling after the end of polishing.

(c-2) Measurement of Dielectric Layer Thickness

In three samples, as illustrated in FIG. 5, a straight line substantially perpendicular to the inner electrode layers was set at a distance of about ½ in the direction L of the L-T cross section. Next, a region (effective section 13) of the sample where the inner electrode layers 16 were stacked was divided into three equal regions: an upper region U, a middle region M, and a lower region D. Except for areas where the thickness was not measured because of, for example, formation of a pillar due to missing of an inner electrode and spanning of a dielectric layer across two layers, the thickness of ten dielectric layers on the perpendicular line was randomly measured near a central part of each region, and the mean was obtained. The thickness was measured at 10 samples×3 regions×10 layers=300 points. The thickness of the dielectric layers was measured by using a scanning electron microscope (SEM). The measurement results are shown in Table 1.

(d) Method for Measuring Number of Crystal Grains in Dielectric Layer

Figure 6:
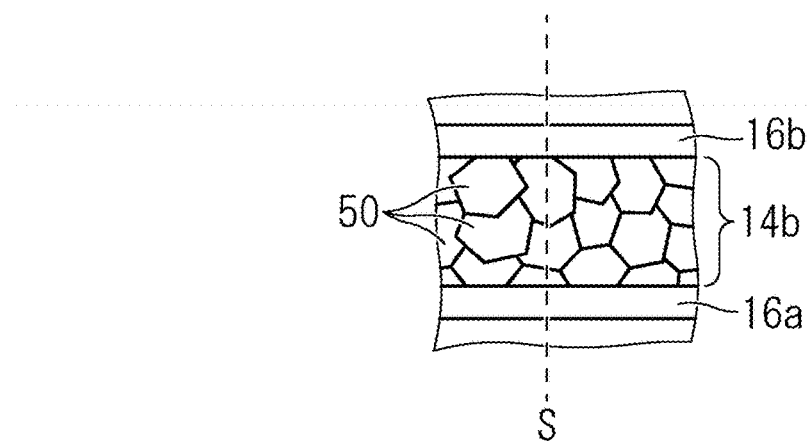
FIG. 6 is a view of the structure of crystal grains in an inner layer part of the multilayer ceramic capacitor according to the present invention.

As illustrated in FIG. 6, the reference line S substantially perpendicular to the inner electrode layer 16 was set in the L-T cross section. The number of the crystal grains 50 in the dielectric layer on the reference line S was measured. The measurement results are shown in Table 1.

(e) Thickness Variation (CV) of Dielectric Layer

The standard deviation of the thickness of the dielectric layers measured above in (c) was obtained and divided by the mean thickness of the dielectric layers to obtain a thickness variation (CV) of the dielectric layers. The results are shown in Table 1.

(f) Measurement of Short-Circuit Rate

The insulation resistance of the multilayer ceramic capacitor after plating was measured. The number of test samples was 100, and capacitors having an insulation resistance of 100Ω or less as measured by using a digital multimeter was determined to be short circuits. The measurement results are shown in Table 1.

(g) Measurement of Permittivity

The electrostatic capacity of the multilayer ceramic capacitor was measured by using an automatic bridge-type measuring device under the conditions of 0.5 Vrms and 1 kHz at 25° C. The number of test samples was 20. From the mean of the obtained measured values (electrostatic capacity: cap), the permittivity was calculated in accordance with the formula $\varepsilon r=(cap \times element\ thickness)/(\varepsilon 0 \times effective\ area \times number\ of\ stacked\ layers)$. In the formula, $\varepsilon 0$ represents permittivity ($8.85419 \times 10^{-12}$ F/m) in a vacuum. The measurement results are shown in Table 1.

(h) Measurement of Life Characteristics in High Temperature Loading Test

A DC voltage of 4 V was applied to 18 multilayer ceramic capacitors at 150° C., and the changes of insulation resistance with time were observed. A failure was defined at the time when the insulation resistance of each multilayer ceramic capacitor reached 10 kΩ or less. The failure time for 18 multilayer ceramic capacitors was analyzed by means of Weibull plotting to obtain the mean time to failure (MTTF). The measurement results are shown in Table 1.

TABLE 1

| | Sample No. | Dy [mol %] | Mg [mol %] | Mn [mol %] | Si [mol %] | Al [mol %] | V [mol %] | Ba/Ti [—] | Grain Size D50 [nm] in Central Part | Dielectric Layer Thickness [μm] |
|---|---|---|---|---|---|---|---|---|---|---|
| * | 1-1 | 0.8 | 0.30 | 0.10 | 0.8 | 0.20 | 0.05 | 1.0080 | 355 | 0.52 |
|   | 1-2 | 0.9 | 0.30 | 0.10 | 0.8 | 0.20 | 0.05 | 1.0080 | 354 | 0.52 |
|   | 1-3 | 1.0 | 0.30 | 0.10 | 0.8 | 0.20 | 0.05 | 1.0080 | 320 | 0.52 |
|   | 1-4 | 1.1 | 0.30 | 0.10 | 0.8 | 0.20 | 0.05 | 1.0080 | 306 | 0.52 |
| * | 1-5 | 1.2 | 0.30 | 0.10 | 0.8 | 0.20 | 0.05 | 1.0080 | 279 | 0.52 |
| * | 1-6 | 1.0 | 0.20 | 0.10 | 0.8 | 0.20 | 0.05 | 1.0080 | 387 | 0.52 |
|   | 1-7 | 1.0 | 0.24 | 0.10 | 0.8 | 0.20 | 0.05 | 1.0080 | 345 | 0.52 |
|   | 1-8 | 1.0 | 0.34 | 0.10 | 0.8 | 0.20 | 0.05 | 1.0080 | 308 | 0.52 |
| * | 1-9 | 1.0 | 0.40 | 0.10 | 0.8 | 0.20 | 0.05 | 1.0080 | 244 | 0.52 |
| * | 1-10 | 1.0 | 0.30 | 0.08 | 0.8 | 0.20 | 0.05 | 1.0080 | 349 | 0.52 |
|   | 1-11 | 1.0 | 0.30 | 0.09 | 0.8 | 0.20 | 0.05 | 1.0080 | 320 | 0.52 |
|   | 1-12 | 1.0 | 0.30 | 0.11 | 0.8 | 0.20 | 0.05 | 1.0080 | 309 | 0.52 |
| * | 1-13 | 1.0 | 0.30 | 0.12 | 0.8 | 0.20 | 0.05 | 1.0080 | 274 | 0.52 |
| * | 1-14 | 1.0 | 0.30 | 0.10 | 0.6 | 0.20 | 0.05 | 1.0080 | 251 | 0.52 |
|   | 1-15 | 1.0 | 0.30 | 0.10 | 0.7 | 0.20 | 0.05 | 1.0080 | 311 | 0.52 |
|   | 1-16 | 1.0 | 0.30 | 0.10 | 0.9 | 0.20 | 0.05 | 1.0080 | 344 | 0.52 |
|   | 1-17 | 1.0 | 0.30 | 0.10 | 1.2 | 0.20 | 0.05 | 1.0080 | 367 | 0.52 |
| * | 1-18 | 1.0 | 0.30 | 0.10 | 1.5 | 0.20 | 0.05 | 1.0080 | 382 | 0.52 |
| * | 1-19 | 1.0 | 0.30 | 0.10 | 0.8 | 0.15 | 0.05 | 1.0080 | 266 | 0.52 |
|   | 1-20 | 1.0 | 0.30 | 0.10 | 0.8 | 0.17 | 0.05 | 1.0080 | 312 | 0.52 |
|   | 1-21 | 1.0 | 0.30 | 0.10 | 0.8 | 0.23 | 0.05 | 1.0080 | 336 | 0.52 |
| * | 1-22 | 1.0 | 0.30 | 0.10 | 0.8 | 0.30 | 0.05 | 1.0080 | 351 | 0.52 |
| * | 1-23 | 1.0 | 0.30 | 0.10 | 0.8 | 0.20 | 0.03 | 1.0080 | 277 | 0.52 |
|   | 1-24 | 1.0 | 0.30 | 0.10 | 0.8 | 0.20 | 0.04 | 1.0080 | 306 | 0.52 |
|   | 1-25 | 1.0 | 0.30 | 0.10 | 0.8 | 0.20 | 0.06 | 1.0080 | 356 | 0.52 |
| * | 1-26 | 1.0 | 0.30 | 0.10 | 0.8 | 0.20 | 0.07 | 1.0080 | 379 | 0.52 |
| * | 1-27 | 1.0 | 0.30 | 0.10 | 0.8 | 0.20 | 0.05 | 1.0080 | 320 | 0.49 |
|   | 1-28 | 1.0 | 0.30 | 0.10 | 0.8 | 0.20 | 0.05 | 1.0080 | 333 | 0.55 |
|   | 1-29 | 1.0 | 0.30 | 0.10 | 0.8 | 0.20 | 0.05 | 1.0080 | 312 | 0.58 |
|   | 1-30 | 1.0 | 0.30 | 0.10 | 0.8 | 0.20 | 0.05 | 1.0080 | 320 | 0.58 |
|   | 1-31 | 1.0 | 0.30 | 0.10 | 0.8 | 0.20 | 0.05 | 1.0080 | 323 | 0.58 |
| * | 1-32 | 1.0 | 0.30 | 0.10 | 0.8 | 0.20 | 0.05 | 1.0070 | 407 | 0.58 |
|   | 1-33 | 1.0 | 0.30 | 0.10 | 0.8 | 0.20 | 0.05 | 1.0073 | 350 | 0.58 |
|   | 1-34 | 1.0 | 0.30 | 0.10 | 0.8 | 0.20 | 0.05 | 1.0083 | 312 | 0.58 |
| * | 1-35 | 1.0 | 0.30 | 0.10 | 0.8 | 0.20 | 0.05 | 1.0085 | 298 | 0.58 |
|   | 1-36 | 1.0 | 0.30 | 0.10 | 0.8 | 0.20 | 0.05 | 1.0080 | 356 | 0.65 |
|   | 1-37 | 1.0 | 0.34 | 0.10 | 0.8 | 0.20 | 0.05 | 1.0080 | 340 | 0.65 |
| * | 1-38 | 1.0 | 0.34 | 0.10 | 0.8 | 0.20 | 0.05 | 1.0080 | 300 | 0.65 |

| | Sample No. | Dielectric Layer Thickness Variation [%] | Number of Crystal Grains in Element | Inner Electrode Layer Thickness [μm] | Short-Circuit Rate [%] | Mean Time to Failure [hour] | Permittivity [—] |
|---|---|---|---|---|---|---|---|
| * | 1-1 | 12.6 | 1.5 | 0.45 | 23 | 8 | 5680 |
|   | 1-2 | 12.4 | 1.5 | 0.45 | 18 | 35 | 5664 |
|   | 1-3 | 12.4 | 1.6 | 0.45 | 20 | 36 | 5120 |
|   | 1-4 | 13.6 | 1.7 | 0.45 | 33 | 46 | 4896 |
| * | 1-5 | 16.8 | 2.0 | 0.45 | 68 | 63 | 4464 |
| * | 1-6 | 12.2 | 1.3 | 0.45 | 10 | 7 | 6192 |
|   | 1-7 | 12.7 | 1.5 | 0.45 | 13 | 33 | 5520 |
|   | 1-8 | 13.6 | 1.7 | 0.45 | 36 | 26 | 4928 |
| * | 1-9 | 17.1 | 2.1 | 0.45 | 88 | 9 | 3904 |
| * | 1-10 | 13.4 | 1.5 | 0.45 | 21 | 4 | 5584 |
|   | 1-11 | 13.8 | 1.6 | 0.45 | 12 | 26 | 5120 |
|   | 1-12 | 13.3 | 1.7 | 0.45 | 26 | 40 | 4944 |
| * | 1-13 | 15.2 | 2.0 | 0.45 | 61 | 44 | 4384 |
| * | 1-14 | 14.6 | 2.1 | 0.45 | 70 | 10 | 4016 |
|   | 1-15 | 12.3 | 1.7 | 0.45 | 21 | 36 | 4976 |
|   | 1-16 | 13.0 | 1.5 | 0.45 | 22 | 34 | 5504 |
|   | 1-17 | 13.3 | 1.4 | 0.45 | 36 | 38 | 5872 |
| * | 1-18 | 15.0 | 1.4 | 0.45 | 73 | 9 | 6112 |
| * | 1-19 | 13.8 | 2.0 | 0.45 | 26 | 5 | 4256 |
|   | 1-20 | 13.0 | 1.7 | 0.45 | 34 | 28 | 4992 |
|   | 1-21 | 12.3 | 1.5 | 0.45 | 34 | 30 | 5376 |
| * | 1-22 | 15.0 | 1.5 | 0.45 | 54 | 9 | 5616 |
| * | 1-23 | 13.6 | 2.0 | 0.45 | 36 | 10 | 4432 |
|   | 1-24 | 12.4 | 1.7 | 0.45 | 30 | 36 | 4896 |
|   | 1-25 | 13.8 | 1.5 | 0.45 | 34 | 41 | 5696 |
| * | 1-26 | 15.0 | 1.4 | 0.45 | 66 | 10 | 6064 |
| * | 1-27 | 18.4 | 1.5 | 0.45 | 87 | 4 | 5120 |
|   | 1-28 | 12.1 | 1.7 | 0.45 | 16 | 53 | 5328 |
|   | 1-29 | 11.8 | 1.9 | 0.45 | 13 | 120 | 4992 |
|   | 1-30 | 12.4 | 1.8 | 0.47 | 20 | 36 | 5120 |
|   | 1-31 | 12.1 | 1.8 | 0.50 | 16 | 64 | 5168 |

TABLE 1-continued

|   | Sample | | | | | |
|---|---|---|---|---|---|---|
| * | 1-32 | 16.3 | 1.4 | 0.45 | 67 | 12 | 6512 |
|   | 1-33 | 13.2 | 1.7 | 0.45 | 25 | 34 | 5600 |
|   | 1-34 | 12.2 | 1.9 | 0.45 | 21 | 31 | 4992 |
| * | 1-35 | 11.4 | 2.0 | 0.45 | 18 | 43 | 4768 |
|   | 1-36 | 12.3 | 1.8 | 0.45 | 10 | 63 | 5696 |
|   | 1-37 | 14.0 | 1.9 | 0.45 | 26 | 43 | 5440 |
| * | 1-38 | 12.0 | 2.2 | 0.45 | 8 | 75 | 4750 |

The symbol * denotes that the samples are outside the scope of the present invention.

A multilayer ceramic capacitor with a short-circuit rate of 40% or less, a permittivity of 4800 or more, and a mean time to failure (MTTF) of 20 hours was rated a good product.

A good product was obtained when the dielectric layers 14 in the effective section 13 contained, relative to 100 parts by mole of Ti, 0.7 to 1.2 parts by mole of Si, 0.9 to 1.1 parts by mole of Dy, 0.24 to 0.34 parts by mole of Mg, 0.17 to 0.23 parts by mole of Al, 0.09 to 0.11 parts by mole of Mn, and 0.04 to 0.06 parts by mole of V; the dielectric layers 14 in the effective section 13 had a Ba/Ti molar ratio of 1.0073 to 1.0083; the number of the crystal grains 50 in the effective section was 1.9 or less per dielectric layer; and the dielectric layers 14 in the effective section 13 had a thickness variation of 14.0% or less.

The grain growth starting temperature can be lowered by reducing the Mg content of the dielectric layers 14. The formation of balls from Ni contained in the inner electrode layers 16 can be suppressed by lowering the grain growth starting temperature. The plastic deformation of the dielectric layers 14 can be suppressed by reducing the Si content of the dielectric layer 14. Therefore, deterioration in smoothness of the dielectric layers 14 can be suppressed.

(2) Experimental Example 2

A multilayer ceramic capacitor 10 was manufactured under the same conditions as those in Experimental Example 1 except for the composition of an outer layer part 14a and an inner layer part 14b of dielectric layers interposed between inner electrode layers 16 and the composition (expressed as "Gap" in Table 2) of ceramic green sheets attached as W gap sections 22a as shown in Table 2.

The outer electrodes 24 of the completed multilayer ceramic capacitor 10 were removed, and the W gap sections 22a were then removed by polishing. An effective section 13 (dielectric layers 14 interposed between the inner electrode layers 16) and the outer layer part 14a only remained and were dissolved in an acid and subjected to ICP emission spectrometry. As a result, it was found that the composition other than Ni, which was a component of the inner electrode layers 16, was substantially the same as the preparation composition shown in Table 2.

The outer electrodes 24 of the completed multilayer ceramic capacitor were removed, and the inner layer part 14b and the outer layer part 14a were then removed by polishing. The W gap sections 22a only remained and were dissolved in an acid and subjected to ICP emission spectrometry. As a result, it was found that the composition was substantially the same as the preparation composition shown in Table 2.

(i) Measurement of Dielectric Layer Grain Size (i-1) Production of Samples for Observation Five samples were fractured so as to expose the W-T cross section at a depth of about ½ in the direction L of the samples. To clearly identify the boundaries (grain boundaries) between grains in the dielectric layer, the above samples were subjected to a heat treatment. The temperature of the heat treatment was a temperature at which grain growth did not occur and the boundaries were clearly identified. In this experimental example, the temperature of the heat treatment was 1000° C.

(i-2) Measurement of Grain Diameter (Grain Size)

Figure 7:
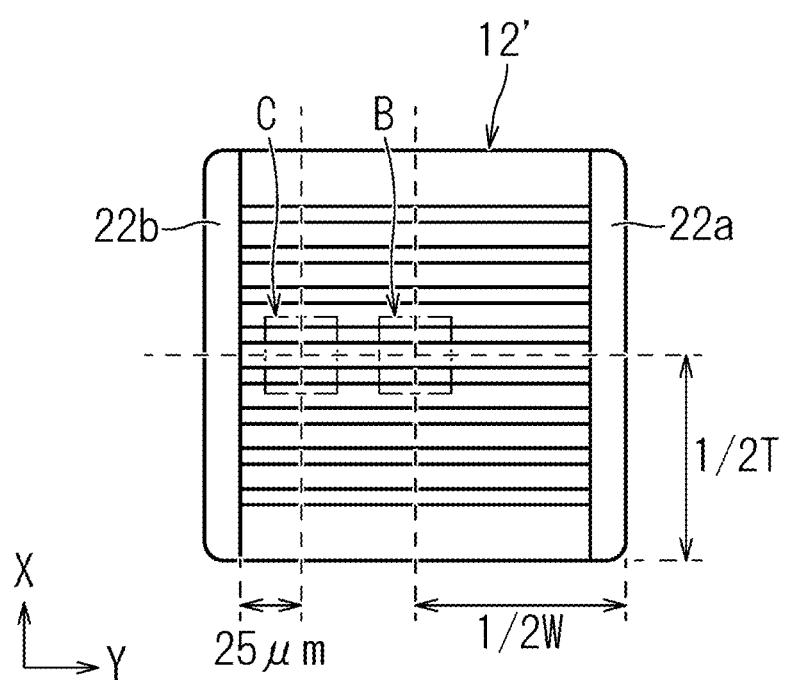
FIG. 7 is a W-T cross-sectional view of the multilayer ceramic capacitor according to the present invention illustrating measurement regions in which the diameter of grains is measured in Experimental Example 2.

As illustrated in FIG. 7, the grains in the dielectric layer were observed at a magnification of 20000 times with a scanning electron microscope (SEM) at a position of about ½ in the direction T of the W-T cross section (region B). In addition, the grains in the dielectric layer were observed at a magnification of 20000 times with a scanning electron microscope (SEM) at a position of about ½ in the directions W and T of the W-T cross section and 25 μm away from the side surface of the inner electrode layer 16 (region C). This position is defined as an end part adjacent to the W gap section 22a. The size of the field view was a region of 6.3 μm×4.4 μm. From the obtained SEM images, 300 grains×5 samples were randomly extracted. The area inside the boundaries of each grain was determined by image analysis to calculate an equivalent circular diameter as a grain diameter. The representative value of the grain diameter was calculated as a D50 diameter.

TABLE 2

| | Inner Layer Part (Other Than W Gap Sections), Outer Layer Part | | | | | | | W Gap Sections | | Grain Size | Dielectric Layer |
|---|---|---|---|---|---|---|---|---|---|---|---|
| Sample No. | Dy [mol %] | Mg [mol %] | Mn [mol %] | Si [mol %] | Al [mol %] | V [mol %] | Ba/Ti [—] | Mg [mol %] | Si [mol %] | D50 [nm] in Central Part | Thickness [μm] |
| 2-1 | 1.0 | 0.30 | 0.10 | 0.8 | 0.20 | 0.05 | 1.0080 | 0.30 | 0.8 | 320 | 0.52 |
| 2-2 | 1.0 | 0.30 | 0.10 | 0.8 | 0.20 | 0.05 | 1.0080 | 1.00 | 2.5 | 302 | 0.52 |
| 2-3 | 1.0 | 0.30 | 0.10 | 0.8 | 0.20 | 0.05 | 1.0080 | 2.00 | 2.5 | 311 | 0.52 |
| 2-4 | 1.0 | 0.30 | 0.10 | 0.8 | 0.20 | 0.05 | 1.0080 | 3.50 | 2.5 | 310 | 0.52 |
| 2-5 | 1.0 | 0.30 | 0.10 | 0.8 | 0.20 | 0.05 | 1.0080 | 3.50 | 1.2 | 305 | 0.52 |
| 2-6 | 1.0 | 0.30 | 0.10 | 0.8 | 0.20 | 0.05 | 1.0080 | 3.50 | 1.8 | 313 | 0.52 |

TABLE 2-continued

| Sample No. | Dielectric Layer Thickness Variation [%] | Inner Electrode Layer Thickness [μm] | Grain Size D50 [nm] in W Gap Section | Grain Size in W Gap Section/ Grain Size in Central Part | Short-Circuit Rate [%] | Mean Time to Failure [hour] | Permittivity [—] | Number of Crystal Grains in Element |
|---|---|---|---|---|---|---|---|---|
| 2-1 | 12.4 | 0.45 | 315 | 0.98 | 20 | 36 | 5120 | 1.6 |
| 2-2 | 12.4 | 0.45 | 280 | 0.93 | 23 | 33 | 4832 | 1.7 |
| 2-3 | 12.4 | 0.45 | 155 | 0.50 | 10 | 48 | 4976 | 1.7 |
| 2-4 | 12.4 | 0.45 | 110 | 0.35 | 8 | 52 | 4960 | 1.7 |
| 2-5 | 12.4 | 0.45 | 240 | 0.79 | 20 | 37 | 4880 | 1.7 |
| 2-6 | 12.4 | 0.45 | 140 | 0.45 | 12 | 51 | 5008 | 1.7 |

A multilayer ceramic capacitor with a short-circuit rate of 40% or less, a permittivity of 4800 or more, and a mean time to failure (MTTF) of 20 hours was rated a good product.

A good product was obtained when the dielectric layers in the W gap sections contained, relative to 100 parts by mole of Ti, 1.8 to 2.5 parts by mole of Si, 2.00 to 3.50 parts by mole of Mg, 0.9 to 1.1 parts by mole of Dy, 0.17 to 0.23 parts by mole of Al, 0.09 to 0.11 parts by mole of Mn, and 0.04 to 0.06 parts by mole of V; and the dielectric layers had a Ba/Ti molar ratio of 1.0073 to 1.0083.

The grain growth adjacent to the side surface-side end parts of the inner electrode layers 16 is suppressed by increasing the Mg content of the W gap sections 22a, resulting in an increased number of grain boundaries. As a result, the intensity of electric field applied to the crystal grains 50 can be reduced to improve reliability. In addition, the formation of balls from Ni in the inner electrode layer 16 in association with grain growth is suppressed to reduce the short-circuit rate. When the ratio of the grain size of the dielectric layers 14 in the effective section 13 in a central part to the grain size of the dielectric layers 14 in the effective section 13 in a region of the side surface-side end parts of the inner electrode layers 16 is 0.35 to 0.50, the short-circuit rate can be reduced, and the electrostatic capacity and the mean time to failure (MTTF) can be improved.

Therefore, the multilayer ceramic capacitor that has reduced short-circuit rate, large electrostatic capacity, and improved mean time to failure (MTTF) while including thin dielectric layers can be provided.

The present invention is not limited to the above embodiments, and various modifications can be made within the scope of the present invention.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer ceramic capacitor comprising:
a multilayer body having a stacked plurality of inner electrode layers and dielectric layers, the multilayer body having an effective section where the inner electrode layers face each other with the dielectric layers interposed therebetween in a stacking direction thereof;
a first outer electrode on a surface of the multilayer body and electrically connected to a first set of the inner electrode layers; and
a second outer electrode on the surface of the multilayer body and electrically connected to a second set of the inner electrode layers,
wherein the dielectric layers in the effective section contain first crystal grains having:
a first perovskite compound containing Ba and Ti; and
relative to 100 parts by mole of the Ti:
0.7 to 1.2 parts by mole of Si;
0.9 to 1.1 parts by mole of Dy;
0.24 to 0.34 parts by mole of Mg;
0.17 to 0.23 parts by mole of Al;
0.09 to 0.11 parts by mole of Mn; and
0.04 to 0.06 parts by mole of V,
the dielectric layers in the effective section have a Ba/Ti molar ratio of 1.0073 to 1.0083,
a number of the first crystal grains in the dielectric layers in the effective section is 1.9 or less per dielectric layer as viewed in the stacking direction, and
the dielectric layers in the effective section have a thickness variation (CV) of 14.0% or less.

2. The multilayer ceramic capacitor according to claim 1, wherein the dielectric layers in the effective section have a mean thickness of 0.65 μm or less.

3. The multilayer ceramic capacitor according to claim 1, wherein
the dielectric layers in W gap sections between the inner electrode layers and side surfaces of the multilayer body contain second crystal grains having:
a second perovskite compound containing Ba and Ti; and
relative to 100 parts by mole of Ti:
1.8 to 2.5 parts by mole of Si;
2.00 to 3.50 parts by mole of Mg;
0.9 to 1.1 parts by mole of Dy;
0.17 to 0.23 parts by mole of Al;
0.09 to 0.11 parts by mole of Mn; and
0.04 to 0.06 parts by mole of V, and
the dielectric layers in the W gap sections have a Ba/Ti molar ratio of 1.0073 to 1.0083.

4. The multilayer ceramic capacitor according to claim 1, wherein a ratio of a first grain size of the dielectric layers in the effective section in a central part of the multilayer body to a second grain size of the dielectric layers in the effective section in a region of side surface-side end parts of the inner electrode layers is 0.35 to 0.50.

5. The multilayer ceramic capacitor according to claim 3, wherein a ratio of a first grain size of the dielectric layers in the effective section in a central part of the multilayer body to a second grain size of the dielectric layers in the W gap sections is 0.35 to 0.50.

6. The multilayer ceramic capacitor according to claim 5, wherein a mean thickness of the W gap sections is 5 μm to 35 μm.

7. The multilayer ceramic capacitor according to claim 3, wherein a mean thickness of the W gap sections is 5 μm to 35 μm.

8. The multilayer ceramic capacitor according to claim 5, wherein a mean thickness of the W gap sections is 18 μm to 20 μm.

9. The multilayer ceramic capacitor according to claim 3, wherein a mean thickness of the W gap sections is 18 μm to 20 μm.

10. The multilayer ceramic capacitor according to claim 1, wherein the mean thickness is 0.52 μm to 0.65 μm.

11. The multilayer ceramic capacitor according to claim 1, wherein the inner electrode layers have a mean thickness of 0.45 μm or less.

12. The multilayer ceramic capacitor according to claim 1, wherein the thickness variation (CV) is 11.0% or less.

* * * * *